Oct. 16, 1962     L. E. McDUFF     3,058,759
FIREWALL CONDUIT SUPPORT
Filed Jan. 8, 1960
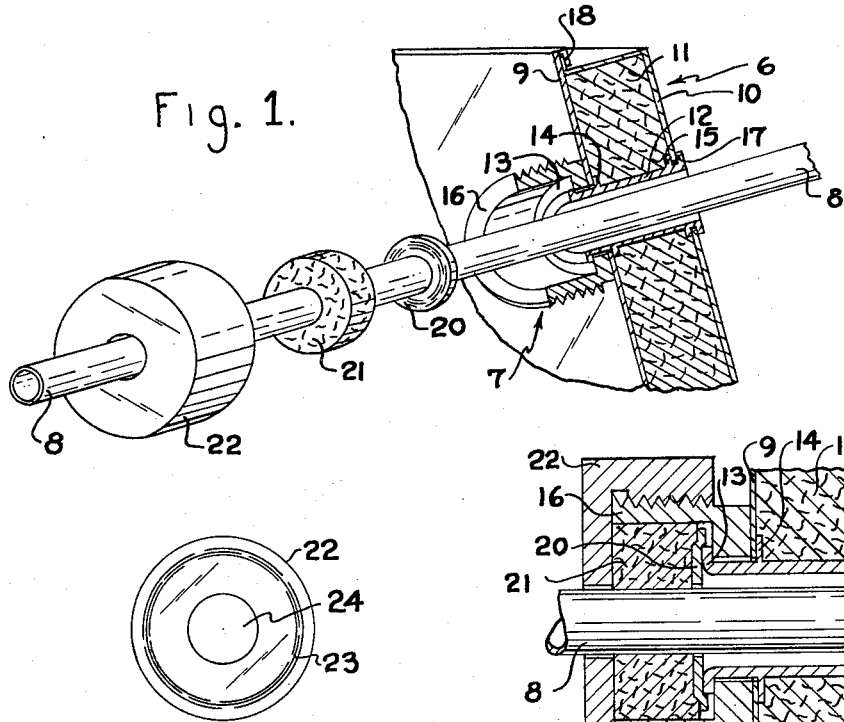
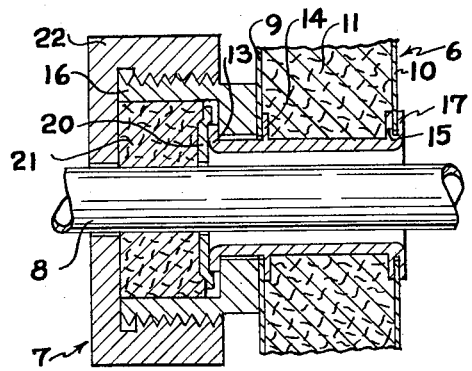
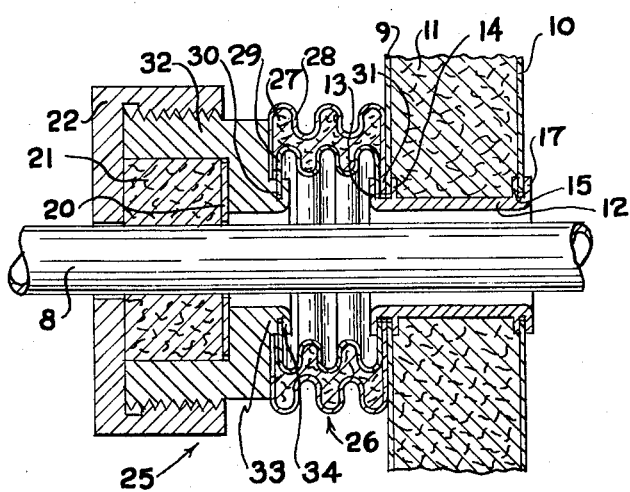
INVENTOR.
LEON E. McDUFF
ATTORNEYS

United States Patent Office 3,058,759
Patented Oct. 16, 1962

3,058,759
FIREWALL CONDUIT SUPPORT
Leon E. McDuff, Corona, Calif., assignor to Johns-Manville Corporation, New York, N.Y., a corporation of New York
Filed Jan. 8, 1960, Ser. No. 1,271
5 Claims. (Cl. 285—47)

The present invention relates to an improved fire wall construction and more specifically is concerned with a coupling-like tubular member extending through a firewall and adapted to retain in vibration damped relationship a conduit-like member therein.

The present invention is primarily concerned with a firewall construction for use in aircraft, and more particularly, a firewall construction which is adapted for positioning rearward of the engine nacelle. Such firewalls are designed to prevent the spreading of fire to other parts of the airplane, which fires may be caused by explosions or combustions occurring within the engine nacelle. Ordinarily, this type of firewall comprises a felted layer of fire-resistant insulating material sandwiched between a pair of metal sheets joined together at their marginal edges. Preferably the fire-resistant insulating material comprises what is commonly known as Q-felt, a material composed primarily of leached glass fibers of high silica content and fine diameter having a high degree of resistance to extreme temperatures. The metal sheets preferably are thinly rolled sheets of Inconel which is a nickel-base alloy to which chromium has been added to increase the resistance to sulfur compounds, the alloy being especially well adapted for use in the presence of higher temperatures. This general type of firewall construction has been found to be ideally suited to airplane construction primarily because of its low weight and the high degree of fire-resistance afforded by the Inconel sheets used in conjunction with the sandwiched layer of fire-resistant insulation.

However, there has been a great deal of trouble encountered in the aircraft industry with respect to the above-described firewall construction. In particular, where conduits or control lines pass through the firewall, past experience has indicated that the conduits or control lines often are subject to breakage immediately within or adjacent the firewall, due to the vibration thereof and the resultant wearing between the control lines and the wall.

It is therefore an object of this invention to provide an improved firewall construction for aircraft and the like which will permit the passage of conduits or control lines therethrough while adequately providing against any breakage of said control lines due to the vibration and resultant wearing between the conduits or control lines and the wall.

It is another object of this invention to provide a firewall with means to retain a conduit positioned therethrough in vibration damped relationship.

Briefly, the above-mentioned objects have been accomplished by using, in combination with a firewall structure comprising parallel relatively thin sheets of metal in face-to-face relationship with insulating material therebetween, a tubular coupling-like member which extends through said firewall, said coupling-like member being especially adapted to retain securely a conduit therein and form with said firewall and conduit a single unitary structure having a high degree of fire-resistance. Said structure also is especially adapted to prevent any wear or breakage of said conduit due to the vibratory motion of the airplane and the subsequent wearing between said conduit and the elements of said coupling-like member and firewall.

Other objects and advantages of the invention will become more apparent during the course of the following description when taken in connection with the accompanying drawings, wherein:

FIG. 1 is an exploded perspective of the coupling member, shown in conjunction with the firewall, having a conduit member positioned therein;

FIG. 2 is a vertical transverse sectional view of the coupling member shown in position within said firewall with the conduit passing therethrough;

FIG. 3 is a front view of the packing nut of said coupling member; and,

FIG. 4 is a vertical transverse sectional view of a modified coupling member shown in position within said firewall with the conduit passing therethrough.

With reference to the drawings, in FIGS. 1 and 2 there is disclosed a firewall indicated generally by the numeral 6, in combination with a tubular coupling-like member, indicated generally by the numeral 7, said coupling member extending through said firewall and having a conduit 8 positioned therein. The firewall comprises two relatively thin metallic sheets 9 and 10 in spaced face-to-face relationship with a fire-resistant insulating layer 11 positioned therebetween. Passing therethrough is a tubular member 12 having three annular flanges 13, 14 and 15 positioned outwardly on the sleeve portion thereof, flange 13 being positioned at one extremity thereof, flange 14 being positioned a relatively short distance therefrom and flange 15 being positioned adjacent the opposite extremity thereof. The end of said tubular member 12 having flanges 13 and 14 positioned annularly and outwardly therefrom holds said sheet 9 and packing retainer member 16 therebetween securely in an abutting relationship. The opposite end portion of tubular member 12 supports the second of said sheets 10 outwardly of said flange member 15, and the outwardly extending end of the tubular member 12 is deformed annularly as shown at 17, thereby securing sheet 10 against flange 15.

A method of forming the above-described firewall construction having tubular member 12 positioned firmly therewith as shown in FIGS. 1 and 2, is to take tubular member 12 having flange members 14 and 15 extending annularly and outwardly therefrom and position said thin sheets 9 and 10 over said tubular member outwardly of annular flanges 14 and 15, place the packing retainer member 16 over said tubular member 12 in abutting relationship with the thin sheet 9, and finally deform both outwardly extending ends of the tubular member 12 into annular flanges 13 and 17, thus securely retaining said sheets 9 and 10 in parallel spaced face-to-face relationship while also securing said retainer member 16 outwardly of sheet 9. When all the necessary tubular members are in place in a given firewall, then fire-resistant insulation material 11 is positioned between said sheets 9 and 10, said sheets 9 and 10 are then joined together at their marginal edges as indicated at 18, and the firewall structure is placed in position in the aircraft rearwardly of the engine nacelle.

After the firewall is placed in position in the aircraft, conduit or control line 8 is positioned within and through the tubular member 12. Retaining washer 20 is slid over conduit 8 in abutting relationship with flange 13, packing washer 21 is then positioned over said conduit 8 and finally the packing nut 22 is positioned thereover and threaded over packing retainer member 16, as illustrated in FIG. 2.

A front view of packing nut 22, showing threads 23 and the centrally disposed circular opening 24, is illustrated in FIG. 3.

The packing washer 21 is firmly compressed by the packing nut 22 around conduit 8, thus firmly securing conduit 8 within tubular coupling member 7. The diameters of the centrally disposed circular openings in the packing nut 22, retaining washer 20 and packing retainer 16 and the inside diameter of tubular member 12 are all larger than the diameter of conduit 8, thus insuring an absence of frictional contact, with resultant wear, between the metallic portions of the tubular coupling member 7 and conduit 8.

Packing washer 21 is composed of felt-like compressible material having fire-resistant insulating properties. Preferably the packing washer 21 is composed of Q-felt, a fine fibrous mat which has been leached so that its final composition is approximately 98% silica. Although the packing washer 21, when compressed around conduit 8 is of such a density as to retain conduit 8 firmly in position, the felt-like material of which it is composed maintains its resilient properties so that shock, caused by the vibrations set up in the engine nacelle, are not transmitted to the conduit but are absorbed by the resilient fibrous washer.

The insulating material interposed between the metal sheets 9 and 10 is also preferably formed of Q-felt. This almost pure quartz insulating material is extremely heat resistant and, when used in conjunction with the Inconel sheets and coupling member shown, is ideally suited for aircraft firewall construction.

FIG. 4 illustrates a modified tubular coupling member 25 having a flexible tubular bellows 26 positioned intermediate tubular member 12 and packing retainer member 32. Bellows 26 is a double-walled structure having insulating material 27 positioned between walls 28 and 29. Wall members 28 and 29 extend inwardly and in abutting relationship at each end of the tubular bellows, as indicated by the numerals 30 and 31. Bellows 26 is secured at one end to tubular member 12 by annular flanges 13 and 14 which secure, therebetween, the inwardly extending portion 31 of bellows 26 in an abutting relationship with sheet 9.

Retaining member 32 has a tubular portion 33 extending outwardly and deformed into an annular flange 34 at its extremity. The inwardly extending portion 30 of bellows 26 is secured to retaining member 32 by the flange 34. The remainder of tubular coupling member 25 is constructed in a manner similar to tubular coupling member 7 and additionally comprises flanges 15 and 17 of tubular member 12 securing metal sheet 10 therebetween, packing nut 22, packing washer 21 and retaining washer 20. Packing nut 22 acts to compress packing washer 21 firmly around conduit 8, thus firmly securing conduit 8 in position within tubular coupling member 25. The bellows 26 offers an additional advantage to coupling member 25 in that additional flexibility is achieved in the presence of vibrations and part of the shock is taken up by bellows 26 before being transmitted to packing retainer member 32.

The insulating material 27 interposed between the wall members 28 and 29 of bellows 26 is preferably Q-felt and wall members 28 and 29 are preferably fabricated of an Inconel alloy in order to achieve an extremely heat resistant structure, although it is contemplated that other heat resistant metallic alloys and insulating materials might equally as well be used.

Preferably all of the parts of the tubular coupling member, except for the insulating material 27 and the packing washer 21, are fabricated of heat resistant metallic alloys and the structures described in FIGS. 2 and 4 present a heat and fire-resistant barrier having a high degree of structural strength in the presence of vibratory shock.

It will be understood that this invention is susceptible to modification in order to adapt it to different usages and conditions and, accordingly it is desired to comprehend such modifications within this invention as may fall within the scope of the appended claims.

What I claim is:

1. In combination, a firewall for use in aircraft comprising two relatively thin sheets of metal in spaced face-to-face relationship having insulating material positioned therebetween, said firewall having a conduit passing therethrough, a tubular coupling-like member adapted to retain securely said conduit therein and to dampen relative vibrations between said firewall and said conduit, said coupling-like member comprising a tubular sleeve, a bellows, said bellows comprising a pair of co-axial, spaced, corrugated metal sheets, said space between said corrugated metal sheets being filled with insulating material, a packing retainer flexibly secured to said firewall by said bellows, a packing nut and a packing washer, said tubular sleeve having means thereon adapted to retain one of said thin sheets of metal at one end thereof and said second thin sheet of metal and bellows in abutting relationship at the opposite end thereof, said bellows being positioned outwardly of said second thin sheet, said packing retainer being circumferentially joined to the outwardly extending end of said bellows and having an outwardly extending threaded flange, said packing nut being adapted to engage said threaded flange and forming, with said packing retainer, a packing area, said packing washer being positioned within said packing area and adapted to be compressed by said packing nut firmly around said conduit, thus firmly retaining said conduit in axial alignment within said coupling-like member, and said packing nut, packing retainer, bellows and tubular sleeve forming an opening through said firewall larger in diameter than said conduit.

2. The combination recited in claim 1, in which the firewall comprises two relatively thin sheets of Inconel metal having a layer of felted substantially pure quartz fibers positioned therebetween.

3. The combination recited in claim 1, in which the packing washer comprises felted substantially pure quartz fibers.

4. The combination recited in claim 2, in which the packing washer comprises felted substantially pure quartz fibers.

5. The combination recited in claim 4, in which the bellows is comprised of two relatively thin sheets of Inconel metal and said insulating material comprises a layer of felted substantially pure quartz fibers.

References Cited in the file of this patent

UNITED STATES PATENTS

| 1,164,152 | Wolf | Dec. 14, 1915 |
| 1,363,378 | Vuilheumier | Dec. 28, 1920 |
| 1,763,574 | Williams | June 10, 1930 |
| 1,820,152 | Neal | Aug. 25, 1931 |
| 2,185,450 | Wager | Jan. 2, 1940 |
| 2,620,208 | Patch | Dec. 2, 1952 |
| 2,698,007 | Tegler | Dec. 28, 1954 |

FOREIGN PATENTS

| 598,046 | Germany | June 4, 1934 |